United States Patent
Rijks

(10) Patent No.: US 8,552,885 B2
(45) Date of Patent: Oct. 8, 2013

(54) EMERGENCY SERVICE WARNING SYSTEM

(75) Inventor: Johan Rijks, Soest (NL)

(73) Assignee: Phyco Trading B.V., Nijkerk (NL)

( * ) Notice: Subject to any disclaimer, the term of this patent is extended or adjusted under 35 U.S.C. 154(b) by 781 days.

(21) Appl. No.: 12/615,854

(22) Filed: Nov. 10, 2009

(65) Prior Publication Data

US 2010/0141475 A1 Jun. 10, 2010

(30) Foreign Application Priority Data

Nov. 11, 2008 (NL) ..................................... 2002201

(51) Int. Cl.
G08G 1/00 (2006.01)
G08G 1/16 (2006.01)
G08G 1/09 (2006.01)
G06F 17/10 (2006.01)

(52) U.S. Cl.
USPC ........... 340/902; 340/901; 340/903; 340/905; 701/301

(58) Field of Classification Search
USPC .......................................... 340/901, 902, 905
See application file for complete search history.

(56) References Cited

U.S. PATENT DOCUMENTS

| | | | |
|---|---|---|---|
| 4,238,778 A | 12/1980 | Ohsumi | |
| 4,241,326 A | 12/1980 | Odom | |
| 6,160,493 A * | 12/2000 | Smith | 340/902 |
| 6,404,351 B1 * | 6/2002 | Beinke | 340/902 |
| 6,529,831 B1 * | 3/2003 | Smith et al. | 701/301 |
| 6,858,707 B1 | 2/2005 | Wei et al. | |
| 6,958,707 B1 | 10/2005 | Siegel | |
| 2002/0008637 A1 * | 1/2002 | Lemelson et al. | 340/907 |
| 2003/0098801 A1 * | 5/2003 | Martin | 340/902 |
| 2003/0141990 A1 * | 7/2003 | Coon | 340/902 |
| 2005/0231385 A1 * | 10/2005 | Haase | 340/905 |
| 2007/0159354 A1 | 7/2007 | Rosenberg | |
| 2009/0096635 A1 * | 4/2009 | McKenna | 340/901 |
| 2009/0174571 A1 * | 7/2009 | McKenna | 340/901 |

FOREIGN PATENT DOCUMENTS

| | | |
|---|---|---|
| DE | 10053099 A1 | 5/2002 |
| EP | 0 942 402 A | 9/1999 |

OTHER PUBLICATIONS

European Patent Office, extended European Search Report in European Patent Application No. 09175717.9 dated Feb. 2, 2010.

* cited by examiner

*Primary Examiner* — George Bugg
*Assistant Examiner* — Jack K Wang
(74) *Attorney, Agent, or Firm* — Leydig, Voit & Mayer, Ltd.

(57) ABSTRACT

An emergency service warning system is described herein that is arranged to warn a user of approach of emergency services. The system includes movable emergency service transmitters (T) and at least one receiver (M, R), arranged to receive signals transmitted by the emergency service transmitters (T). The system is provided with at least one stationary emergency service communication device (M) for the purpose of communication with the emergency service transmitter (T) utilizing emergency service signals. The system includes at least one user receiver (R) which is arranged to detect emergency service signals and to deliver a warning signal upon detection of an emergency service signal.

20 Claims, 1 Drawing Sheet

EMERGENCY SERVICE WARNING SYSTEM

CROSS-REFERENCE TO RELATED APPLICATIONS

This patent application claims the benefit of Rijks, Netherlands application NL 2002201 filed on Nov. 11, 2008, the contents of which are incorporated herein by reference in their entirety, including any references therein.

FIELD OF THE INVENTION

The invention relates to an emergency service warning system, arranged to warn a user of approach of emergency services, provided with at least one movable emergency service transmitter; and at least one receiver arranged to receive signals transmitted by the emergency service transmitter.

BACKGROUND OF THE INVENTION

Such a system is known from U.S. Pat. No. 4,238,778. The known system can make known the presence of an approaching emergency service vehicle (for instance an ambulance), to adjust speed depending on the warning signals of the emergency service vehicle being heard and seen.

In the known system, the emergency service vehicle is provided with a separate transmitter, which transmits a radio-frequency warning signal. The warning signal has a predetermined frequency, for instance in the VHF or UHF range. Another motor vehicle is provided with a receiver, arranged to receive the radio-frequency warning signal transmitted by the emergency service vehicle. The receiver tuned to the predetermined frequency delivers an acoustic signal to warn a driver of the motor vehicle, upon reception of the warning signal.

According to U.S. Pat. No. 4,238,778, a communication possibility is preferably provided which allows a driver of the emergency service vehicle to give commands to the driver of a motor vehicle to be warned, via the transmitter. An advantage is that the driver of a motor vehicle can be alerted to the approach of an emergency service vehicle in a timely manner and can take appropriate measures, for instance by timely moving to the side.

SUMMARY OF THE INVENTION

A disadvantage of the known system is that it is relatively complex.

The object of the present invention is to solve this problem. In particular, the invention contemplates an emergency service warning system capable of efficiently warning a user of one or more approaching emergency services.

To this end, the system according to the invention is characterized by the features of claim 1.

The system is advantageously provided with at least one stationary emergency service communication device for the purpose of communicating with the emergency service transmitter utilizing emergency service signals, the system being further provided with at least one user receiver which is arranged to detect emergency service signals and to deliver a warning signal upon detection of an emergency service signal.

Emergency services are typically already provided with communication systems/means, for instance a specific emergency services communication network. Often, such a communication network is well protected from listening in ('monitoring'). Unauthorized persons therefore cannot make use of such an emergency services communication network.

Such a network comprises for instance stationary communication units (for instance radio masts) spread over a relatively large area, and mobile communication equipment (for instance walkie-talkies, radiophones and the like), which communication equipment can transmit the emergency service signals to the stationary units.

An idea of the present invention comprises the advantageous use of such emergency service communication systems/means, in themselves already in circulation (which normally cannot be monitored by ordinary road users), as part of an emergency service warning system.

In particular, to this end, at least one user receiver is arranged to detect the (in themselves already available) emergency service signals and to deliver a warning signal upon detection of an emergency service signal (coming from a mobile transmitter of an approaching emergency service).

In particular, the system according to the invention is arranged to make no use of specific warning transmitters (to be taken along by emergency services) to transmit specific warning signals to user receivers. In this way, emergency services hence do not need to be provided with separate warning transmitters. Thus, a relatively simple, relatively inexpensive, well implemented and particularly efficient warning system can be obtained. Moreover, the emergency services can then use the emergency service signals in unmodified form for their own use, for instance for internally (i.e. between the emergency services mutually) passing on position information, speech and/or other communication information. Preferably, this internal emergency service communication (i.e., at least comprising the signals transmitted by an emergency service mentioned) is encrypted in a known manner, so that the content of the emergency service communication cannot be monitored by others (i.e., for instance ordinary road users, which are not provided with specific emergency service transmitters).

Thus, in particular, a user receiver of the present system is not arranged to decode signals transmitted by an emergency service transmitter, for instance encoded digital signals. In particular, moreover, the user receiver is not provided with, or associated with, its own emergency service transmitter. A user of the user receiver is hence unable to transmit emergency service signals.

Preferably, the receiver is arranged to merely detect (the presence of) emergency service signals, and to deliver a warning signal upon a detection of such a signal, without deciphering a possible content of the emergency service signals.

Further, the user receiver is preferably arranged to determine the strength (in particular field strength) of a received emergency service signal, for instance to be able to assess how far a respective emergency service is removed from the receiver. The receiver may for instance deliver a warning signal which depends on a measured strength of a received emergency service signal, which warning signal preferably depends further on a direction of reception of the received signal.

The invention furthermore provides a method of delivering a warning in case of an approaching emergency service, wherein the emergency service transmits respective signals, wherein a number of stationary emergency service communication devices are set up to receive emergency service signals, wherein at least one user receiver associated with a user verifies whether an emergency service signal is being transmitted, and delivers a warning signal if an emergency service signal has been detected.

In this way, the above-mentioned advantages can be achieved. According to a further elaboration, the method comprises associating a detected emergency service location with position information, for instance position information provided by a GPS system, and preferably storing the position information, more preferably in a database. To this end, the system may for instance be provided with or integrated with the traffic control alert system for road users which is known per se from Dutch patent NL1026352, which patent is understood to be wholly incorporated into the present application by reference.

The invention moreover provides a user receiver of a system according to the invention. The receiver is then preferably arranged for use in a method according to the invention, and can provide the above-mentioned advantages, in particular in combination with one or more emergency service transmitters mentioned and one or more stationary emergency service communication devices mentioned.

BRIEF DESCRIPTION OF THE DRAWINGS

Further advantageous elaborations of the invention are described in the subclaims. Presently, the invention will be clarified with reference to a non-limitative exemplary embodiment and the drawing. In the drawing:

Like or corresponding features in this application are designated by like or corresponding reference characters.

DETAILED DESCRIPTION OF THE DRAWINGS

Figure 1:
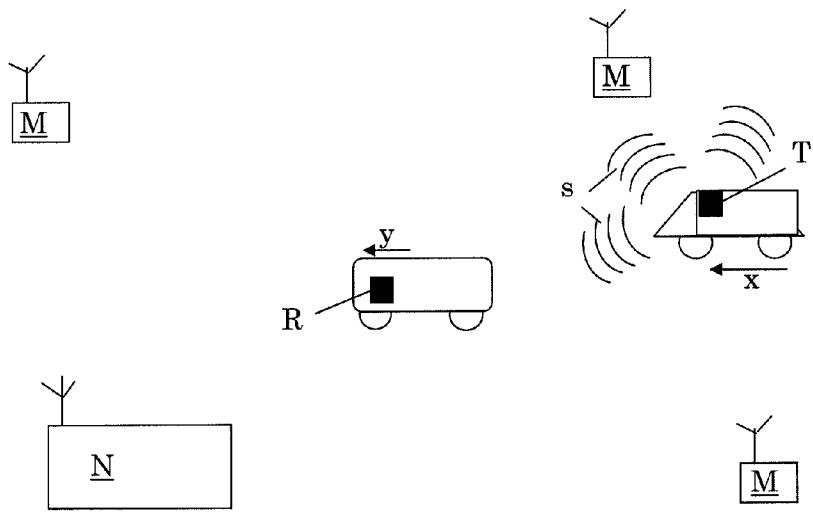
FIG. 1 shows schematically an exemplary embodiment of the invention.

FIG. 1 shows an example of a system which is provided with movable emergency service transmitters T, and receivers M, R, arranged to receive signals transmitted by the emergency service transmitters T.

In particular, the system comprises several emergency service transmitters T (of which only one is shown) and several emergency service communication devices M, which are part of a national or regional emergency service communication network. The transmitters T are in particular mobile transmitters, which can for instance be carried along by emergency services (for instance vehicles and/or staff, for instance, of ambulance services, police, fire brigade, and the like). An emergency service transmitter T may for instance comprise a walkie-talkie, and/or be part of an emergency service vehicle. Arrow x in FIG. 1 designates movement of an emergency service vehicle which comprises such a transmitter T.

The system is provided, in particular, with stationary emergency service transmitter/receiver devices M for the purpose of communication with the mobile emergency service transmitters T, utilizing emergency service signals (i.e. radio signals associated with the emergency service) S. The emergency service signals S may for instance comprise encoded digital signals S, a decoded message, speech or other information to be communicated, during communication via the transmitter T. As will be elucidated hereinbelow, the communication signals S preferably comprise in any case periodic signals, which are for instance transmitted when the transmitter T is in an active mode (in particular to report the presence of the transmitter T to the network).

The stationary emergency service communication devices M comprise in particular stationary network stations, for instance radio masts. The network stations M are for instance set up such that a relatively large coverage area, preferably national or regional, is obtained, in order for the emergency services to maintain communicative contact with the network as reliably as possible (via the network stations M, utilizing the transmitters T).

The emergency service communication network T, M may for instance comprise a stable and reliable digital communication network arranged, for instance, to transmit speech and data in digitally encoded form from mobile units (which are provided with the transmitters T) via the stations M to one or more central radio rooms N and/or transmitters of other mobile users (not represented). Preferably, the emergency service communication network T, M is based on the Tetra standard, known per se. The network T, M may for instance be the C2000 system being in use in the Netherlands, or a similar system.

An aspect of the invention provides an advantageous use of the digital communication network T, M. In particular, the invention provides an emergency service warning system, arranged to warn a receiver user of the approach of emergency services, while the signals S transmitted by the mobile transmitters T can provide extra functionality.

As shown in FIG. 1, to the above-mentioned end, the system is provided with at least one user receiver R which is arranged to detect emergency service signals S and to deliver a warning signal upon detection of an emergency service signal, in order to warn a respective user that an emergency service is in the vicinity. On the basis of the warning signals, the receiver R can preferably indicate a global distance to, and direction of the transmitter T that has transmitted the signals. The user receiver R is for instance associated with a respective user, for instance a road user, who in particular is not part of the emergency service. The present system is so designed that this user cannot use the user receiver R to make content of communication sent via the communication network T, M available.

Figure 2:
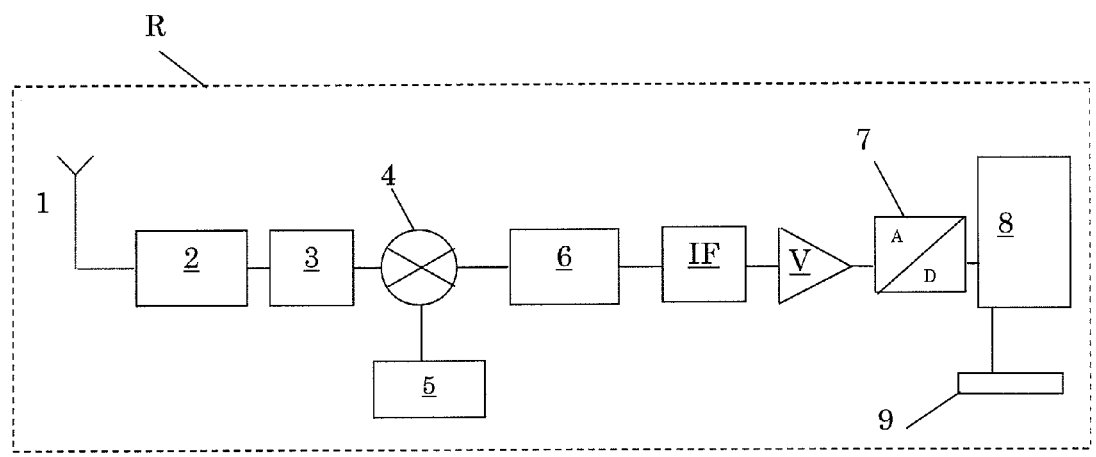
FIG. 2 shows a schematic example of a user receiver according to an exemplary embodiment of the invention.

The user receiver R may be implemented in different manners. A non-limiting example of the receiver R is represented in FIG. 2, and is elucidated below.

The receiver R may, for instance, be designed to be portable by a user. The receiver R may be arranged to be coupled to, for instance built into, a user vehicle. Moreover, the receiver R may, for instance, be part of a user vehicle. The receiver R may, for instance, be provided with means for stable installation of the receiver in a user vehicle.

Thus, FIG. 1 shows schematically a traveling (arrow y) user vehicle carrying such a receiver R. In the illustrative example set forth in FIG. 1, the emergency service vehicle containing the transmitter T is coming up from behind with respect to the user vehicle containing the receiver R, but the system also works, for instance, in case of an oncoming emergency service vehicle. The user receiver R can timely warn a respective driver (i.e. road user) that an emergency service vehicle is approaching, in order that the user can take measures (e.g., move to the side of the road, stop, etc.).

According to a further elaboration, the emergency service signals S can comprise at least one signal periodically transmitted by the transmitter T (with a constant period, for instance of one or a few seconds). The user receiver R is then preferably arranged to detect, for instance to recognize, the periodic signals, for the purpose of detection of the respective transmitter T. The periodically transmitted signal proper comprises for instance a relatively short signal, for instance of a length of less than 1 second, in particular less than 0.1 second. Preferably, the transmitter T transmits this periodic signal all the time, for instance at least if the transmitter T is in an active mode and, for instance, is not used to conduct an encoded conversation. In this way, the user receiver R can properly distinguish an emergency service signal S from noise and possible interference signals, detection of the emergency service then being even possible if the respective transmitter T is in the active mode.

Further, it is advantageous when the transmitter T is arranged to transmit signals via different communication channels, within a predetermined frequency band. This frequency band may for instance comprise the frequency range between 380 and 385 MHz, or another frequency band. In particular, the frequency band is above 200 MHz, and for instance below 1 GHz. A band width of the predetermined frequency band may for instance be larger than 1 MHz, and in particular may be at least 5 MHz.

The user receiver R is then preferably configured to receive signals from the whole predetermined frequency band, to allow all the channels mentioned to be received simultaneously. In other words: preferably, the user receiver R is arranged not to be tuned to a single channel of the different communication channels of the network.

According to a further elaboration, the system comprises one or more stationary emergency service transmitters, for instance transmitters of the radio rooms N mentioned. It is then advantageous if the stationary emergency service transmitters N and mobile emergency service transmitters T utilize different communication bands. Further, it is here preferred if each user receiver R is configured not to search for signals possibly transmitted by the stationary emergency service transmitters N (for instance by not specifically searching for signals that are transmitted in a respective communication band of for instance basic posts, radio rooms or headquarters).

Use of the system shown in FIG. 1 preferably comprises a method of delivering a warning that an emergency service is approaching. As the figure shows, the emergency service (mobile as such) transmits the emergency service signals S, over a communication channel within the predetermined frequency band, and for instance periodically, to stationary emergency service communication devices M.

A stationary emergency service communication device M can receive the signals S from a proximate emergency service transmitter T, to offer communication via the emergency service communication network. The signals S may for instance comprise periodically transmitted report signals, provided with digital information, to report the emergency service transmitter T periodically to the network, or to periodically keep in contact with the network.

The user receiver R verifies whether an emergency service signal S is being transmitted, in particular by 'listening' in the predetermined frequency band to signals (preferably instantaneously at all frequencies within the frequency band). Preferably, the user receiver R processes all signals received by the receiver R to detect the periodic emergency service signals. In particular, the present receiver R is not capable of decoding encoded information possibly present in the emergency service signals S.

The user receiver R proceeds to deliver a warning signal if the receiver detects an emergency service signal. To this end, the receiver R may for instance be provided with, or coupled to, a suitable alert device 9, for instance a loudspeaker, display, or the like.

As mentioned, the emergency service signals S may be transmitted via different channels within the predetermined frequency band. Accordingly, the user receiver R preferably receives signals from the whole predetermined frequency band, comprising all the channels mentioned, and processes the signals to detect emergency service signals.

The user receiver R may for instance be arranged to determine the strength and reception direction of a received emergency service signal S. Determining a direction of reception may for instance be carried out utilizing antennas suitable for that purpose, for instance a number of directionally sensitive antennas and the like. The warning signal delivered by, or under the influence of, the receiver R can then provide information concerning the strength and the direction of the emergency service signal.

As mentioned previously herein above, it is advantageous if position information is available, for instance information provided by a GPS system. The user receiver R may for instance be arranged to generate such position information, for instance, when the receiver R is provided with a GPS receiver. In that case, the user receiver R can, for instance, associate the location where an emergency service has been detected with the position information, and preferably store it, for instance, in a central (e.g., stationary) database. The database may, for instance, be the database described in NL1026352.

Turning to FIG. 2, an example of a user receiver R is schematically depicted. The receiver R has a relatively simple and inexpensive design, and is capable of detecting the signals mentioned surprisingly reliably.

The receiver R is provided with an antenna 1 to receive radio-frequency signals. The antenna 1 may in itself be designed in different manners, and in particular is arranged to receive signals within a large bandwidth.

The present user receiver R is provided with a first band pass filter 2, coupled to the antenna 1 to receive the signals therefrom, and arranged to pass only signals that are within a defined frequency band. In this way, a first demarcation can be achieved, in order to search more specifically for signals S transmitted by a transmitter T. The first filter 2 can, for instance, prevent overload of the receiver, and for instance prevent other parts of the receiver R being disturbed by, for instance, signals outside a band to be received.

Preferably, the receiver R is provided with a signal amplifier 3 to amplify received signals. In the example, such a signal amplifier 3 is connected to an output of the first filter 2, to amplify at least the frequency band passed by the filter 2.

A particularly advantageous embodiment comprises use of a mixer 4 and an oscillator 5 (for instance a crystal-driven oscillator), which are arranged to remix signals received by the receiver R to an intermediate frequency. As shown in FIG. 2, the mixer 4 is set up to process the signals passed by the first band pass filter 2 (and amplified by amplifier 3). In this way, relatively simply, a good filter can be made to be selective for the signals that are to be received. An intermediate frequency is for instance below the predetermined frequency band.

Emergency service signals can be detected particularly well from the signal provided by the mixer 4. To this end, it is advantageous to provide a second band pass filter 6, to filter the signals processed by the mixer anew.

The second filter 6 can ensure that only those signals are passed that actually need to be received. The second filter 6 can accomplish the desired selectivity of the receiver. Preferably, the second filter 6 is relatively broadband, and relatively steep in the flanks. Good results are obtained if the second filter 6 is at least a $5^{th}$ order filter (preferably for instance a $7^{th}$ order filter), with a band pass width of for instance 5 MHz (or other width). This is especially advantageous if the emergency service transmitters T utilize different channels within a defined frequency band.

Preferably, a second signal amplifier IF is provided to amplify the signals provided by the second filter 6, and to deliver an RSSI ('Received Signal Strength Indication') signal. A buffer and filter V is provided, to filter the RSSI signal (inter alia to prevent aliasing) and to buffer it (to make a correct adaptation for the analog-digital converter 7).

Further, the receiver R comprises an analog-digital converter 7, arranged to digitize the analog signals filtered and processed by the electronic components 2-6 discussed above, IF, V, for the purpose of digital data processing by a digital signal processor 8. The converter 7 may for instance be part of the processor 8, or be a separate component. The converter 7 may further in itself be provided, for instance, with anti-aliasing means, to prevent aliasing in a signal sampling to be carried out by that converter.

The signal processor 8 is arranged to distinguish particular emergency service signals from interference signals, and may be implemented in different manners. The signal processor 8 may for instance comprise suitable signal processor microelectronics, a microcontroller, or the like. The processor 8 may be arranged to recognize a period (of transmitted emergency service signals) in the digitized signal, and to produce a warning signal as soon as the processor recognizes such a period. Further, the processor 8 may for instance be designed to adjust the warning signal to a strength and direction of a received, recognized emergency service signal.

In the example, the receiver R itself comprises an alert device 9, designed to provide a user with information that the receiver R has discerned an emergency service signal. Alternatively, the alert device may be a separate component, which is for instance drivable by the receiver R, or connectable to the receiver, for instance via a suitable interface.

Preferably, a second signal amplifier IF is provided (not shown) to amplify the signals provided by the second filter 6, and to produce an RSSI ('Received Signal Strength Indication') signal. The RSSI signal, after filtering (inter alia to prevent aliasing) and buffering (making appropriate adjustment for the A/D converter), can be presented to the A/D converter 7 to allow subsequent digital processing thereof.

The system described hereinabove is particularly well suited for use by road users. Thus, the user receiver R can timely inform a road user of an approaching emergency service, independently of whether or not warning signals (siren, flashing light) are being used by the emergency service. The receiver R may, for instance, receive emergency service radio signals 5, and warn the road user automatically with suitable acoustic and visual signals if emergency service radio signals S have been recognized by the receiver (for instance recognition based on a constant period in such signals S). This has a safety enhancing effect in particular if, for instance, an accident has taken place, in bad weather conditions (fog, snow, or heavy rainfall). The user receiver R can prevent false messages particularly well, which may be achieved in particular by the use of suitable filter elements (labeled 2-6 in FIG. 2) in combination with a digital signal processor, and more in particular with the second signal amplifier IF mentioned.

By making use of an optional GPS receiver, the system can be expanded in a simple manner, to store emergency service locations (automatically) in a central, external database. In this manner, emergency service locations may be shared with other drivers, to provide extra safety.

It will be self-evident that the invention is not limited to the exemplary embodiment described. Various modifications are possible within the scope of the invention as set forth in the appended claims.

Thus, the term "a" in this application can mean, for instance, just one, at least one, or a plurality.

Furthermore, a communication between the stationary emergency service communication device and the emergency service transmitter can, for instance, comprise at least transmission of radio signals from the transmitter to the receiver.

According to a further elaboration, the mobile transmitter is part of a mobile emergency service communication unit (e.g., a walkie-talkie), arranged to provide two-way communication via the emergency service communication network.

A warning signal to be produced by (or under the influence of the user receiver may for instance comprise an acoustic signal, a visual signal, or both, or any other suitable warning signal.

Further, it is advantageous if an emergency service transmitter T is configured to transmit respective (for instance periodic) signals continuously (or, for instance, intermittently), in particular as long as the transmitter T is switched on, for instance to report to the network periodically.

The user receiver R is for instance arranged to search automatically and continuously for emergency service signals transmitted by mobile transmitters T, within a predetermined (relatively broad) frequency band.

What is claimed is:

1. An emergency service warning system, arranged to warn a user of approach of emergency services, the system comprising:
   at least one movable emergency service transmitter;
   at least one receiver arranged to receive signals transmitted by the emergency service transmitter; and
   wherein the at least one receiver comprises:
      at least one stationary emergency service communication device for communicating with said emergency service transmitter utilizing encoded digital emergency service signals by deciphering encoded content of the encoded digital emergency service signals, and
      at least one user receiver arranged to detect, without deciphering a possible content of the encoded digital emergency service signals, an instance of the encoded digital emergency service signals and deliver a warning signal upon detecting the instance of the encoded digital emergency service signals.

2. The system according to claim 1, including multiple emergency service transmitters and stationary emergency service communication devices, which are part of a national or regional emergency service communication network, the emergency service communication devices comprising in particular stationary network stations.

3. The system according to claim 1, wherein the least one user receiver is taken from the group of user receiver types consisting of:
   user receivers designed to be portable by a user; and
   user receivers designed to be part of a user vehicle.

4. The system according to claim 1, wherein said encoded digital emergency service signals comprise at least one signal transmitted periodically by the transmitter, wherein said user receiver is arranged to detect said periodic signals for the purpose of detection of the respective transmitter.

5. The system according to claim 1, wherein said transmitter is arranged to transmit signals via different communication channels, within a predetermined frequency band, wherein the user receiver is configured to receive signals from the whole predetermined frequency band.

6. The system according to claim 5, wherein said user receiver is provided with a first band pass filter, arranged to pass only signals within said predetermined frequency band, wherein the mixer is set up to process the signals passed by the first band pass filter, wherein said user receiver is provided with a second band pass filter to filter the signal processed by the mixer anew, wherein an amplifier and transmitter are provided to amplify signals provided by the second filter and deliver an RSSI signal.

7. The system according to claim 1, wherein said user receiver is provided with a mixer and an oscillator, which are arranged to remix signals received by the receiver to an intermediate frequency.

8. The system according to claim 7, wherein said user receiver is provided with a first band pass filter, arranged to pass only signals within said predetermined frequency band, wherein the mixer is set up to process the signals passed by the first band pass filter, wherein said user receiver is preferably provided with a second band pass filter to filter the signal processed by the mixer anew.

9. The system according to claim 1, wherein the user receiver is provided with a digital signal processor, arranged to distinguish particular emergency service signals from interference signals.

10. The system according to claim 1, further provided with at least one stationary emergency service transmitter, wherein the stationary emergency service transmitter and mobile emergency service transmitters utilize different communication bands.

11. The user receiver of a system according to claim 1 wherein the system is arranged to perform the steps of:
   transmitting, by the emergency service, encoded digital emergency service signals;
   receiving, by one or more stationary emergency service communication devices, the encoded digital emergency service signals for subsequent deciphering of encoded content;
   verifying without deciphering a possible content of the encoded digital emergency service signals, by at least one user receiver associated with a user, whether an instance of the encoded digital emergency service signal is being transmitted; and
   delivering, by the at least one user receiver, a warning signal in response to detecting the instance of the encoded digital emergency service signals during the verifying step.

12. A method of delivering a warning in case of an approaching mobile emergency service, the method comprising the steps:
   transmitting, by the mobile emergency service, encoded digital emergency service signals;
   receiving, by one or more stationary emergency service communication devices, the encoded digital emergency service signals for subsequent deciphering of encoded content;
   verifying without deciphering a possible content of the encoded digital emergency service signals, by at least one user receiver associated with a user, whether an instance of the encoded digital emergency service signals is being transmitted; and
   delivering, by the at least one user receiver, a warning signal in response to detecting the instance of the encoded digital emergency service signals during the verifying step.

13. The method according to claim 12, wherein the encoded digital emergency service signals are transmitted via different channels within a predetermined frequency band, wherein the user receiver receives signals from the whole predetermined frequency band, comprising all said channels, and processes the signals to detect emergency service signals.

14. The method according to claim 13, wherein a bandwidth of the predetermined frequency band is greater than 1 MHz.

15. The method according to claim 14, wherein a bandwidth of the predetermined frequency band is at least 5 MHz.

16. The method according to claim 12, wherein the delivered warning signal provides information concerning the strength and/or direction of a detected emergency service signal.

17. The method according to claim 12, comprising transmitting a periodic signal, wherein said user receiver processes all signals received by the receiver to verify whether the signals comprise the periodic signal.

18. The method according to claim 12, comprising associating a location where an emergency service has been detected with position information.

19. The method according to claim 18, wherein the position information is position information provided by a GPS system.

20. The method of claim 19 further comprising storing the position information.

* * * * *